United States Patent
Ito et al.

(10) Patent No.: US 6,299,912 B1
(45) Date of Patent: Oct. 9, 2001

(54) PREPARATION FOR ADMINISTRATION TO ANIMALS AND FEEDING METHOD THEREOF

(75) Inventors: Shinobu Ito, Tokyo; Kuniaki Shimbo, Kanagawa; Eiji Ogata, Tokyo, all of (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/556,460

(22) Filed: Apr. 24, 2000

Related U.S. Application Data

(60) Provisional application No. 60/144,816, filed on Jul. 21, 1999.

Foreign Application Priority Data

Apr. 23, 1999 (JP) .................................................. 11-117258

(51) Int. Cl.[7] .............................. A23K 1/00; A23K 1/175
(52) U.S. Cl. .................................... 426/2; 426/72; 426/74; 426/805; 426/807
(58) Field of Search .................................. 426/2, 72, 74, 426/807, 805

(56) References Cited

U.S. PATENT DOCUMENTS

| | | | | |
|---|---|---|---|---|
| 3,671,549 | * | 6/1972 | Hinkley | 260/343.7 |
| 4,999,437 | * | 3/1991 | Dobler et al. | 549/222 |
| 5,229,147 | * | 7/1993 | Kubota et al. | 426/2 |
| 5,937,790 | * | 8/1999 | Ito et al. | 119/174 |
| 6,022,867 | * | 2/2000 | Ito et al. | 514/100 |
| 6,063,937 | * | 5/2000 | Diubala et al. | 549/218 |
| 6,121,464 | * | 9/2000 | Bottcher et al. | 549/222 |

FOREIGN PATENT DOCUMENTS

| | | | | |
|---|---|---|---|---|
| 62285759 | * | 8/1987 | (JP) | . |
| 2042996 | * | 2/1990 | (JP) | . |
| 94093821 | * | 11/1994 | (JP) | . |
| 07-053581 | | 2/1995 | (JP) | C07F/9/655 |
| 09-077784 | | 3/1997 | (JP) | C07F/9/655 |
| 2649435 | * | 9/1997 | (JP) | . |
| 10-017580 | | 1/1998 | (JP) | C07F/9/09 |
| 11-071387 | | 3/1999 | (JP) | C07F/9/655 |
| 2000-309596 | | 11/2000 | (JP) | C07F/9/655 |

* cited by examiner

*Primary Examiner*—Chhaya D. Sayala
(74) *Attorney, Agent, or Firm*—Sughrue, Mion, Zinn, Macpeak & Seas, PLLC

(57) ABSTRACT

A preparation for administration to animals, comprising a sparingly soluble L-ascorbic acid-2-phosphoric ester salt having a solubility in water of 10 wt % or less, the solubility being a value obtained by placing 100 g of purified water in a 200 ml-volume beaker, stirring the water while keeping the temperature at 20° C., adding 0.1 g of the L-ascorbic acid-2-phosphoric ester salt every 5 minutes by taking care not to cause gelation, and 30 minutes after the addition of L-ascorbic acid-2-phosphoric ester salt when the undissolved L-ascorbic acid-2-phosphoric ester salt is observed visually in the aqueous solution, determining the amount in weight percentage of L-ascorbic acid-2-phosphoric ester salt added based on water, and a method for feeding animals, using the preparation.

11 Claims, No Drawings

PREPARATION FOR ADMINISTRATION TO ANIMALS AND FEEDING METHOD THEREOF

CROSS REFERENCE TO RELATED APPLICATIONS

This application is an application filed under 35 U.S.C. §111(a) claiming benefit pursuant to 35 U.S.C. §119(e)(1) of the filing date of the Provisional Application No. 60/144,816 filed Jul. 21, 1999 pursuant to 35 U.S.C. §111(b).

FIELD OF THE INVENTION

The present invention relates to a preparation for administration to animals, comprising a sparingly soluble L-ascorbic acid-2-phosphoric ester salt, and also relates to a feed containing the preparation and a method for feeding animals using the preparation or feed.

BACKGROUND OF THE INVENTION

L-ascorbic acid is an indispensable vital ingredient for animals (including aquatic animals) and plays an important role particularly in the synthesis of collagen or the elimination of active oxygen in vivo. Furthermore, L-ascorbic acid is one of very important nutrients for animals as a vitamin having an anti-stress effect. However, L-ascorbic acid is unstable and readily oxidized or degraded to lose its activity. In order to prevent this, use of an L-ascorbic acid-2-phosphoric ester salt as an additive for animal feed has been proposed (see, for example, JP-A-8-124109 (the term "JP-A" as used herein means an "unexamined published Japanese patent application")).

L-ascorbic acid phosphoric ester salt is an excellent vitamin C supply source for animals and usually it is administered to animals in a composition, more specifically, by a known method of blending it in feed, feed raw material, feed additive, feed additive raw material, animal drug or animal drug raw material. On the other hand, in the feeding of useful animals such as cattle, fowl, pets, experimental animals or aquatic animals, problems occur in these useful animals such as aging, depression of resistance against diseases, generation of stress, reduction in hatch ratio, deterioration of egg or meat quality, propagation disorder, mastitis or reduction of somatic cells in milk. Therefore, it has been heretofore keenly demanded to solve these problems.

Particularly, in the feeding of useful animals having a high added value, such as fowl, quail, cattle, pigs, horses, dogs, cats, rats, mice, guinea pigs, monkeys, Japanese river trout, carp, sea bream, salmon, eel, yellowtail, purple blue back bass, globefish, flatfish, tuna, saurel, horse mackerel, blue back bass, green tiger prawn and giant tiger prawn, the production is being performed in a highly efficient manner. However, due to increase in the feeding density, promotion of aging, depression of resistance against diseases, generation of stress, acceleration of oxidation of meat, deterioration of meat quality such as blackening, or increase in propagation disorder tends to occur more frequently. Propagation disorder is caused by premature birth, reduction of conception ratio, ovulatory retardation, death of embryo, weakened estrous symptom, or reduction in the production of progesterone. Furthermore, when mastitis occurs, the number of somatic cells in milk increases and the commercial value of the milk is lowered markedly. For the purpose of treating or preventing the propagation disorder or mastitis, various vitamins including L-ascorbic acid phosphoric ester salts and derivatives thereof, and minerals have been heretofore added, individually or in combination, to the drinking water or feed and then fed to useful mammals.

Poultry such as fowl and quail under overcrowded feeding suffer from depression of resistance against diseases, generation of stress, deterioration of meat quality and propagation disorder, and in the case of poultry for laying, additionally a reduction in egg quality. In order to overcome these problems, various vitamins including L-ascorbic acids and derivatives thereof, and minerals have been heretofore added, individually or in combination, to the drinking water or feed and then fed to poultry.

In aquatic culturing, the aquatic animals under overcrowded feeding suffer from problems of aging, depression of resistance against diseases, generation of stress, deterioration of meat quality, deterioration of egg quality and additionally, reduction in hatching ratio and degradation of the body color. In order to overcome these problems, various vitamins including ascorbic acid phosphoric ester salts and derivatives thereof, and minerals have been conventionally added individually or in combination to the feed or feed additives and then fed to Japanese river trout, carp, sea bream, salmon, eel, yellowtail, globefish, flatfish, tuna, horse mackerel and green tiger prawn.

However, when conventional L-ascorbic acid phosphoric ester salts are supplied to animals, a slight amount of the salt is degraded in the alimentary canal. Furthermore, in a feed having a large water content and containing a phosphoric acid ester hydrolase such as phosphatase, the amount of the salt is slightly reduced. As a result, a 100% dose cannot be supplied to animals. It is confirmed in the tests by the present inventors that water-soluble L-ascorbic acid phosphoric ester salts are very swiftly hydrolyzed by phosphatase present in specific feed raw materials such as wheat.

Conventional L-ascorbic acid phosphoric ester salts are sometimes degraded to 10% or more in the absence of phosphatase or by heating, pressurization or unknown catalyst or enzyme during the production process. The degradation in 10% or more of the L-ascorbic acid phosphoric ester salt added is one of main factors of the serious decrease in the commercial value of feed or the like produced.

Heating or pressurization is applied particularly by special instruments such as pelletizer, extruder and drier. In the case of a pelletizer or drier, the temperature necessary for achieving the purpose is 60° C. or more, and in the case of an extruder, it is 100° C. or more. At the production of feed for special aquatic animals such as yellowtail, purple blue back bass, sea bream and green tiger prawn, where the heating condition is relatively severe, or in the case of special twin-screw extruder, the temperature is 110° C. or more. Under these special conditions, a sparingly soluble L-ascorbic acid phosphoric ester salt is degraded in a few % or more and the addition efficiency disadvantageously decreases.

L-Ascorbic acid phosphoric ester salts are expensive as compared with general vitamin C, therefore, at the addition to relatively inexpensive feed, the depletion efficiency must be restrained to the minimum limit.

SUMMARY OF THE INVENTION

Objects of the present invention are to obtain a preparation for administration to animals, which is very scarcely degraded in the alimentary canal of animals and undergoes almost no reduction of L-ascorbic acid phosphoric ester salt even in a feed having a large water content or containing phosphoric acid ester hydrolase such as phosphatase or even under heating or application of pressure, and to provide feed containing the preparation and a method for feeding animals using the preparation or feed.

As a result of continuous studies on various L-ascorbic acid phosphoric ester salt derivatives, the present inventors have found that a sparingly soluble L-ascorbic acid phosphoric ester salt as one of L-ascorbic acid phosphoric ester salts has very high stability as compared with ordinary ascorbic acid phosphoric ester salts and the stability in the digestive tract or feed containing water or phosphatase is greatly improved. The present invention has been accomplished based on this finding.

The present invention provides a preparation for administration to animals and a feeding method described below:

(1) a preparation for administration to animals, comprising a sparingly soluble L-ascorbic acid-2-phosphoric ester salt having a solubility of 10 wt % or less, the solubility being a value obtained by placing 100 g of purified water in a 200 ml-volume beaker, stirring the water while keeping the temperature at 20° C., adding 0.1 g of the L-ascorbic acid-2-phosphoric ester salt every 5 minutes by taking care not to cause gelation, and 30 minutes after the addition of L-ascorbic acid-2-phosphoric ester salt when the undissolved L-ascorbic acid-2-phosphoric ester salt is observed visually in the aqueous solution, determining the amount in weight percentage of L-ascorbic acid-2-phosphoric ester salt added based on water;

(2) the preparation for administration to animals as described in (1) above, wherein when an X-ray diffraction spectrum of the sparingly soluble L-ascorbic acid-2-phosphoric ester salt is measured under the following conditions and the maximum peak A exclusive of noises on the chart and the height B of a peak having a higher base line are determined, the ratio A/B is 1.1 or more:

X-ray diffraction conditions:

powder X-ray diffraction spectrum method, X-ray source: CuKα ray, output: 50 kV or 180 mA, slit width: 1°, 1° or –0.3 mm, scan: θ/2θ method, continuous scanning, scan rate: 10°/min, measured range: from 5 to 90°.

(3) the preparation for administration to animals as described in (1) or (2) above, wherein the sparingly soluble L-ascorbic acid-2-phosphoric ester salt is a single or composite salt of a divalent or greater valence metal or a composite salt of a divalent or greater valence metal with a monovalent metal;

(4) the preparation for administration to animals as described in any one of (1) to (3) above, wherein the sparingly soluble L-ascorbic acid-2-phosphoric ester salt is a composite material coated with a digestible and non-hydrophilic coating agent;

(5) the preparation for administration to animals as described in any one of (1) to (4) above, which is formulated at a temperature of from 60 to 300° C. and/or under a pressure of from 0;001 to 10 MPa;

(6) the preparation for administration to animals as described in any one of (1) to (5) above, which is used for feed or feed additives;

(7) the preparation for administration to animals as described in any one of (1) to (6) above, which contains a phosphatase having a phosphatase activity defined below of 1 or more:

definition of phosphatase activity:

assuming that the activity of producing 1 μg of p-nitrophenol within one minute at the initial stage of reaction in a buffer solution at 37° C. using disodium p-nitrophenylphosphate as the substrate is 1 unit, a larger value between the activity in terms of the unit number per gram at a pH of 4.0 and the activity at a pH of 9.0 is defined as the phosphatase activity;

(8) the preparation for administration to animals as described in any one of (1) to (7) above, wherein the animal is one or more selected from the group consisting of fowl, quail, cattle, pig, horse, dog, cat, rat, mouse, guinea pig, monkey, Japanese river trout, carp, sea bream, salmon, eel, yellowtail, purple blue back bass, globefish, flatfish, tuna, saurel, horse mackerel, blue back bass, green tiger prawn and giant tiger prawn;

(9) a method for feeding animals, comprising administrating a preparation for administration to animals described in any one of (1) to (8) above to animals; and

(10) the method for feeding animals as described in (9) above, wherein the animal is one or more selected from the group consisting of fowl, quail, cattle, pig, horse, dog, cat, rat, mouse, guinea pig, monkey, Japanese river trout, carp, sea bream, salmon, eel, yellowtail, purple blue back bass, globefish, flatfish, tuna, saurel, horse mackerel, blue back bass, green tiger prawn and giant tiger prawn.

DESCRIPTION OF THE PREFERRED EMBODIMENTS

The L-ascorbic acid phosphoric ester salt for use in the present invention is an alkali metal and/or alkaline earth metal single salt or composite salt of L-ascorbic acid-2-phosphate and this is a sparingly soluble L-ascorbic acid phosphoric ester salt having a solubility of 10 wt % or less, preferably 5 wt % or less, more preferably 1 wt % or less.

Furthermore, this L-ascorbic acid phosphoric ester salt is a crystalline and sparingly soluble L-ascorbic acid phosphoric ester salt such that when an X-ray diffraction spectrum is measured under the conditions described above, the ratio A/B of the maximum peak A exclusive of noise on the chart to the height B of a peak having a higher base line is 1.1 or more, preferably from 2 to 9, and a sharp peak peculiar to a crystalline substance is present on the X-ray diffraction chart.

The L-ascorbic acid phosphoric ester salt having such a crystal form has a sparingly soluble property as compared with other salts. If A/B exceeds 10, the crystallinity is too high and absorptivity in vivo disadvantageously decreases.

The sparingly soluble L-ascorbic acid phosphoric ester salt of the present invention is a single salt or composite salt of a divalent metal or a composite salt of a divalent metal and a monovalent metal. This is because when the sparingly soluble L-ascorbic acid phosphoric ester salt is bonded to the divalent metal, the insolubility drastically increases.

The divalent or greater valence metal which can be used in the sparingly soluble L-ascorbic acid phosphoric ester salt of the present invention may be any salt as long as it is a divalent or greater valence metal selected from alkaline earth metal and other heavy metals. Examples thereof include an elemental substance of salts such as calcium, barium, magnesium, aluminum, strontium, zinc and iron, and a mixture thereof. Of these, divalent metals are particularly preferred.

The sparingly soluble L-ascorbic acid phosphoric ester salt of the present invention may be a mixture of a divalent metal and a monovalent metal or another salt. The divalent metal content may be sufficient if it is 1% or more of the entire weight. Specific examples of the combination include calcium sodium, calcium potassium, calcium magnesium, magnesium sodium, magnesium calcium, magnesium sodium calcium, and magnesium potassium sodium, however, the present invention is by not means limited thereto.

The sparingly soluble L-ascorbic acid phosphoric ester salt of the present invention may also be a composite material coated with a digestible and non-hydrophilic covering agent. Examples of non-hydrophilic covering agents for use in the present invention are a fatty acid or fatty acid ester having from 12 to 22 carbon atoms, an animal or vegetable fat and oil or hydrogenated animal or vegetable fat and oil having a melting point of 40° C. or more, and a cera or wax having a melting point of 40° C. or more, these may be used individually or as a mixture of two or more thereof. Examples of animal or vegetable fats and oils or hydrogenated animal or vegetable fats and oils having a melting point of 40° C. or more include palm oil, beef tallow, 54 hydrogenated tallow, beef tallow limiting hydrogenated oil, lard, hydrogenated castor oil and hydrogenated rape seed oil. Examples of cera and wax include beeswax, carnauba wax, Japan wax and rice wax. Any fat and oil may be used as long as it is hardened at ordinary temperature.

The method for coating the sparingly soluble L-ascorbic acid phosphoric ester salt of the present invention with a covering agent may be applied to various methods commonly used in the coating of medical products.

Examples of the method include a method of coating the covering agent on the surface of a medical product, a method of coating the covering on the surface of a medical product using hydroxypropyl cellulose or the like, and a method of coating the covering agent as an enteric film using an enteric film-forming agent such as methyl methacrylate-methacrylic acid copolymer, cellulose acetate phthalate and hydroxypropyl methylcellulose phthalate.

The preparation for administration to animals according to the present invention includes the above-described sparingly solubleb L-ascorbic acid phosphoric ester salt and a composite material obtained by coating a covering agent on the salt. The sparingly soluble L-ascorbic acid phosphoric ester salt or a composite material thereof may be used by itself as a preparation for administration to animals or may be blended with other ingredients. The preparation for administration to animals according to the present invention may be used as feed after blending it with feed raw materials and also may be used in the form of a premix, animal drug, milk replacer, nutrient enhancer, drinking water drug, tablet, paste, suppository, soft capsule or the like.

The preparation for administration to animals containing a sparingly soluble L-ascorbic acid phosphoric ester salt according to the present invention may be administered to animals by any administration method and the method is not particularly limited. For example, the preparation may be administered by a method of orally administering a sparingly soluble L-ascorbic acid phosphoric ester salt in primary form as it is, a method of orally administering the preparation after adding it to feed, other vitamins or other medical products, a method of percutaneously administering the preparation through percutaneous absorption by applying or attaching a sparingly soluble L-ascorbic acid phosphoric ester salt to skin or mucous membrane of an animal, or by a method of diluting a sparingly soluble L-ascorbic acid phosphoric ester salt with an appropriate solvent, adding, if desired, other medicaments thereto and injecting or infusing the solution.

Also, a sparingly soluble L-ascorbic acid phosphoric ester salt in the form of a powder may be administered as it is or may be formulated into a preparation by mixing it with any excipient permitted in the safety law, such as rice bran oil cake, wheat flour, glucose, silicic acid anhydride and bran.

Examples of the shape of the preparation include powder, tablet, pellet, fine grain and capsule. The tablet or the like may be formed in a usual manner using, if desired, an excipient, a disintegrator, a binder or a lubricant.

Examples of excipients include saccharides such as lactose, D-mannitol, D-sorbitol and saccharose, starches such as corn starch and potato starch, and inorganic salts such as calcium phosphate., calcium sulfate and precipitated calcium carbonate. Examples of disintegrators include starches such as hydroxypropyl starch, sodium carboxymethyl starch and partial α disintegrated starch, cellulose derivatives such as calcium carboxymethyl cellulose, carboxymethyl cellulose and low substitution degree hydroxypropyl cellulose, and other synthetic polymers having cross-linked structure such as polyvinylpyrrolidone.

Examples of binders include polymers such as polyvinylpyrrolidone, hydroxypropyl cellulose, hydroxypropylmethyl cellulose, gelatin and gum arabic. Examples of lubricants include natural origin products and derivatives thereof such as talc, waxes and light silicic acid anhydride, and fatty acids and metal salts thereof such as stearic aid, magnesium stearate, calcium stearate, aluminum stearate, saccharose fatty acid ester.

By virtue of the stability of sparingly soluble L-ascorbic acid phosphoric ester salt, the preparation for administration to animals according to the present invention has sufficiently high stability even under heating or pressure during the production process thereof Under the conditions of heating or pressurizing, an ordinary L-ascorbic acid phosphoric ester salt may degrade to few % or more. However, in the case of the preparation for administration to animals according to the present invention, the high stability effect of the present invention can be brought out even in the production conditions including a step of heating the preparation at a temperature of from 60 to 300° C., preferably from 100 to 300° C., more preferably from 110 to 300° C., and/or pressurizing it at from 0.001 to 10 MPa, preferably from 0.1 to 1 MPa.

The feed of the present invention is obtained by blending feed raw materials with the above-described preparation for administration to animals containing a sparingly soluble L-ascorbic acid phosphoric ester salt. Examples of feed raw materials include those commonly used in feeds, such as grain flour (e.g., wheat flour, starch), bean flour, fish oil and grass. The feed raw material and the preparation for administration to animals of the present invention may be blended at an arbitrary ratio. Examples of feed forms include powder feed, pellet feed, crumble feed, extruder feed, expansion feed, moist feed, paste feed, flow feed and liquid feed. The preparation for administration to animals of the present invention can be stably blended irrespective of the form of the feed.

The feed may be produced by a method of adding a binder such as a saccharide, and water to the feed raw material and the preparation for administration to animals of the present invention, further adding, if desired, other ingredients or materials such as vitamin A, a thickener, a mineral, a seasoning and a condiment, and then subjecting the mixture, if desired, to pelletization through extrusion and cutting in a usual manner, or granulation through rolling or the like, or by any other method.

The preparation for administration to animals containing a sparingly soluble L-ascorbic acid phosphoric ester salt of the present invention is not impaired in stability even at a high temperature of 100° C. or more, therefore, it is most suitable for extruder feed and expansion feed which are treated at a high temperature of 100° C. or more. Also, the preparation is suitable for a powder feed and a pellet feed, of which production process includes a step of humidification with steam or the like.

The preparation for administration to animals or feed of the present invention can exert its high effect particularly where the raw material contains phosphatase. In general, the phosphatase content in the preparation for administration to animals or in feed raw material rapidly changes according to the freshness of raw material or the processing method, therefore, the presence of phosphatase is very difficult to control by specifying the kind of raw material. However, it is found that raw materials having a high frequency of containing phosphatase can be specified. Among a large number of raw materials used as the feed raw material, raw materials selected from wheat and fish oil contain phosphatase with high possibility. When this raw material is present in an amount of from 1 to 80 wt %, the present invention can bring out a high effect.

In the case when the water content during the production process is 5 wt % or more, preferably 10 wt % or more, more preferably 20 wt % or more, the phosphatase activity increases. Even under this condition, the sparingly soluble L-ascorbic acid phosphoric ester salt of the present invention is stable. The present invention can exert a higher effect when phosphatase in the preparation for administration to animals or feed raw material measured by the above-described method is 1 or more, preferably 10 or more, or when water in the above-described range and phosphatase as above are simultaneously present during the production process.

In the case where the preparation for administration to animals of the present invention is a feed pellet, the present invention may be applied to pellets of any size or aperture. For example, the feed may be a feed pellet having an aperture of from 1 to 200 mm, and either a pellet produced by an extruder or a pellet produced by an ordinary pelletizing machine may be used.

The animal to which the preparation for administration to animals or feed of the present invention is applied is cattle, fowl, pets, experimental animals or aquatic animals under culturing and the animal is not particularly limited. However, the preparation for administration to animals or feed of the present invention is effective particularly in the Japanese river trout, carp, sea bream, salmon, eel, yellowtail, purple blue back bass, globefish, flatfish, tuna, saurel, horse mackerel, blue back bass, green tiger prawn and giant tiger prawn. These animals are grown at a high density within a short time, therefore, stress is readily generated and the demand for ascorbic acid is high. The preparation for administration to animals or feed containing a sparingly soluble L-ascorbic acid phosphoric ester salt of the present invention can exert its effect particularly for the following useful animals under breeding at such a high density.

The composition for administration to useful animals, containing a sparingly soluble L-ascorbic acid phosphoric ester salt of the present invention exerts an excellent effect in feed for aquatic animals, particularly phosphatase-containing moist pellet feed, more particularly land production moist pellet, still more particularly land production moist pellet for yellowtail, purple blue back bass, sea bream, flat fish, horse mackerel and blue back bass. Because yellowtail, purple blue back bass, sea bream, flat fish, horse mackerel and blue back bass are expensive fish, addition of vitamin C to the composition in a large amount is necessary. Furthermore, land moist pellet is preferably used in some regions. In this context, the present invention is highly valuable.

In the case when a nutritional effect of ascorbic acid phosphoric ester salt on animals is required the sparingly soluble L-ascorbic acid phosphoric ester salt present in the preparation for administration to animals or feed of the present invention is usually blended in an amount of from 0.1 to 1,000 ppm based on the entire weight of feed administered. In the case where the animal as an object of administration is in the growth period or in the period of stress or disease infection or infection probability, the sparingly soluble L-ascorbic acid phosphoric ester salt is preferably blended in an amount of from 20 to 1,000 ppm. The upper limit of the blending amount on administration may exceed the above-described range, however, in some cases, the effect accompanying the increase of dose may level off or depending on the animal, excess uptake of ascorbic acid phosphoric ester salt occur. Therefore, the dose preferably does not exceed 1,000 ppm.

An antioxidant may be applied simultaneously with the preparation for administration to animals or feed of the present invention so as to aid in the improvement of stability. Specific examples thereof include vitamin C and derivatives thereof other than sparingly soluble L-ascorbic acid phosphoric ester salts, carotene and derivatives thereof, dl-α-tocopheryl acetic acid ester, vitamin E and derivatives thereof, SOD, glutathione, catechins, β-carotene, α-carotene, retinoin acid, retinoin, astaxanthin, canthaxanthin, zeaxanthin, lutein and isomers thereof.

The preparation for administration to animals and the feed using the preparation of the present invention contain a specific sparingly soluble L-ascorbic acid phosphoric ester salt, therefore, even when they are administered to animals, decomposition in the alimentary canal scarcely takes place. Furthermore, even when the feed has a large water content or contains a phosphoric acid ester hydrolase such as phosphatase or when the preparation or feed is produced under heating or application of pressure, reduction in the activity of ascorbic acid phosphate is small. By using this preparation or feed, efficient feeding of animals can be attained.

EXAMPLE

The present invention is described in greater detail below, however, the present invention should not be construed as being limited thereto. Unless otherwise indicated, all percent part ratios and the like are by weight.

Example 1

Production of Pellet:

100 g of magnesium ascorbic acid-2-phosphate produced by Showa Denko K. K. was dissolved in 2 liter of water, and thereto, 1 liter of an aqueous solution having 50 g of calcium chloride dissolved therein was added to precipitate calcium magnesium L-ascorbic acid-2-phosphate. To the precipitate, 2 liter of ethanol was gradually added. Then, crystals were separated and obtained by filtration and dried by blowing hot air at 50° C. to obtain 122 g of sparingly soluble calcium magnesium L-ascorbic acid-2-phosphate of the present invention as a white crystal. The thus-obtained sparingly soluble calcium magnesium L-ascorbic acid-2-phosphate had a solubility of 1 wt % or less and an A/B ratio of 6.55.

120 g of this sparingly soluble calcium magnesium L-ascorbic acid-2-phosphate and wheat flour were mixed to make a total weight of 1 kg. This mixture and water corresponding to 10 wt % were fed together to an extruder, kneaded, extruded into a rod form, cut and dried to produce ascorbic acid-enriched pellets (water content: 9 wt %) for cattle, fowl and marine animals. In the extruder, the pressure was 0.39 MPa (4 kg/cm2) and the temperature was 123° C. In the extruder produced pellet, the residual ratio of sparingly soluble calcium magnesium L-ascorbic acid-2-phosphate was very high of 98%.

This ascorbic acid-enriched pellet for animals was added to respective ordinary pellets for fowl, quail, cattle, pig, horse, dog, cat, rat, mouse, guinea pig, monkey, Japanese river trout, carp, sea bream, salmon, eel, yellowtail, purple blue back bass, globefish, flatfish, tuna, saurel, horse mackerel, blue back bass, green tiger prawn and giant tiger prawn, which are almost free of vitamin C or derivative thereof. Using each pellet, each animal was fed, as a result, the feed efficiency and the growth rate in the segment where the sparingly soluble calcium magnesium L-ascorbic acid phosphate was added, both were 1.2 times higher than the segment where the salt was not added. Furthermore, the ratio of death due to disease or stress was 0.3 times or less. Thus, good feeding results were verified.

Examples 2 to 13, Comparative Examples 1 to 12

The compounds shown in Table 1 were tested in the same manner as in Example 1 and the residual ratio of L-ascorbic acid-2-phosphoric ester salt after production was measured. The results are shown in Table 1. In Table 1, the production machine shows the kind of machine used for producing the feed, for example, the feed produced by an extruder machine was simply EX, the feed produced by a pelletizer machine was PM, and the land production moist pellet for yellowtail, purple blue back bass, sea bream, flat fish, horse mackerel and blue back bass was RM. The water amount is a value obtained by calculating the water content of raw material in the production machine, and the pressure and the temperature are the pressure and temperature in the production machine, respectively. The aperture is the pellet aperture.

L-Ascorbic acid-2-phosphate is simply AP. For example, APMgCa is calcium magnesium L-ascorbic acid-2-phosphate. The phosphatase activity of the feed raw material before the production is shown as a PT value. The compound with "coating" is obtained by coating an ascorbic acid phosphoric ester salt with carnauba wax using a conventional method.

The A/B of L-ascorbic acid phosphoric ester salt is shown by an X value. The higher the X value, the lower the amorphous degree.

TABLE 1

| | | Ingredient | Solubility (wt %) | Production Machine | Water Amount (wt %) | Pressure (kg/cm$^2$) | Temperature (° C.) | Aperture (mm) | PT Value (unit/g) | Residual Ratio (%) | X Value |
|---|---|---|---|---|---|---|---|---|---|---|---|
| Example | 2 | APMg | 9 | EX | 10 | 4 | 123 | 7 | 151 | 92 | 1.09 |
| | 3 | APBa | <1 | EX | 10 | 4 | 123 | 7 | 151 | 95 | 8.01 |
| | 4 | APCa | <1 | EX | 10 | 4 | 123 | 7 | 151 | 96 | 5.04 |
| | 5 | APCaNa | <1 | EX | 10 | 4 | 123 | 7 | 151 | 97 | 2.03 |
| | 6 | APCaMg | <1 | EX | 10 | 4 | 123 | 7 | 151 | 99 | 9.00 |
| | 7 | APCaNaK | <1 | EX | 10 | 4 | 123 | 7 | 151 | 95 | 1.19 |
| | 8 | APMgCaNa | <1 | EX | 10 | 4 | 123 | 7 | 151 | 98 | 4.56 |
| | 9 | APMgNa | 7 | EX | 10 | 4 | 123 | 7 | 151 | 95 | 8.75 |
| | 10 | APMg | 2.1 | EX | 10 | 4 | 123 | 7 | 151 | 96 | 8.88 |
| | 11 | coating, APMg | <1 | EX | 10 | 4 | 123 | 7 | 151 | 97 | 7.82 |
| | 12 | APCaNa | <1 | PM | 10 | not measured | 70 | 7 | 237 | 96 | 2.33 |
| | 13 | APMgCa | <1 | RM | 20 | not measured | 4 | 7 | 526 | 98 | 6.55 |
| Comparative Example | 1 | APNa | 75 | EX | 10 | 4 | 123 | 7 | 151 | 67 | 1.08 |
| | 2 | APNa | 75 | EX | 10 | 4 | 121 | 7 | 0 | 75 | 1.08 |
| | 3 | APMg | 12 | EX | 10 | 4 | 122 | 7 | 0 | 83 | 1.07 |
| | 4 | APMg | 12 | EX | 10 | 4 | 124 | 3 | 0 | 85 | 1.07 |
| | 5 | APMg | 12 | EX | 10 | 4 | 122 | 3 | 25 | 83 | 1.07 |
| | 6 | APMg | 12 | EX | 10 | 4 | 123 | 6 | 26 | 74 | 1.07 |
| | 7 | APMg | 12 | EX | 10 | 4 | 122 | 7 | 5891 | 81 | 1.08 |
| | 8 | APNa | 75 | PM | 10 | not measured | 70 | 7 | 237 | 80 | 1.06 |
| | 9 | APMg | 12 | RM | 20 | not measured | 4 | 7 | 526 | 75 | 1.08 |
| | 10 | APCaNa | 13 | EX | 10 | 4 | 121 | 7 | 151 | 81 | not measured |
| | 11 | APCaK | 12 | EX | 10 | 4 | 123 | 7 | 151 | 79 | not measured |
| | 12 | APCaH | 13 | EX | 20 | 4 | 122 | 7 | 153 | 83 | not measured |

As seen from the results in Table 1 the sparingly soluble L-ascorbic acid-2-phosphoric ester salts having a solubility of 10 wt % or less of the present invention are extremely high in residual ratio as compared with the control segment, thus, they are verified to have the capability of giving good results.

Example 14

Animal Growth Test:

A sparingly soluble magnesium calcium L-ascorbic acid-2-phosphate according to the present invention, of which the solubility in water is 1 wt % and A/B is 9, was added to feed and using the feed, a growth test was performed as follows to examine the effect of promoting the growth.

For the first segment, feed was prepared by adding thereto 100 ppm of ordinary (water-soluble) sodium L-ascorbic acid phosphate. For the second segment, feed was prepared by adding thereto 100 ppm of a sparingly soluble magnesium calcium L-ascorbic acid phosphate having a solubility in water of 1 wt % of the present invention. For the third segment, feed was prepared by adding thereto 100 ppm of ordinary sodium L-ascorbic acid phosphate. For the fourth segment, feed was prepared without adding any L-ascorbic acid. As other feed ingredients, feed raw material obtained by excluding L-ascorbic acid from the composition of a commercially available feed for sea bream was used. The extruder was used under the conditions of 115° C. and 0.42 MPa (4.3 kg/cm$^2$). The drying was performed with hot air at 80° C. for 2 hours. The phosphatase activity in the feed raw material was 103 unit/g.

Test Procedure:

Test segments were organized by grouping 100 heads of sea bream fry having an average weight of 20 g per head for one segment and the fry in each segment were fed in a test water bath for 40 days by supplying the feed prepared above. The test results are shown in Table 2.

TABLE 2

Growth Test of Sea Bream

| | Increase of Weight (g/head/day) | Feed Efficiency | Death Ratio |
|---|---|---|---|
| Segment 1 | 0.22 | 0.73 | 5% |
| Segment 2 | 0.25 | 0.76 | 1% |
| Segment 3 | 0.19 | 0.68 | 20% |
| Segment 4 | 0.19 | 0.65 | 25% |

As seen in Table 2, the growth promoting effect on sea bream was found in Segments 1 and 2 where the sparingly soluble L-ascorbic acid-2-phosphoric ester salt was added, whereas in Segments 3 and 4, not only the growth was bad but also the death ratio was very high.

Reference Example 1

20 kinds of each feed raw material shown in Table 3 were ordered from different manufactures at different times and the phosphatase activity was measured by the following method. The frequency of detecting 1 or more unit of phosphatase was shown by percentage.

Phosphatase Measurement Conditions:

The activity of producing 1 μg of p-nitrophenol within 1 minute in the initial stage of reaction in a buffer solution at 37° C. using a disodium p-nitrophenylphosphate substrate was taken as 1 unit. A higher value between the activity in terms of the unit number per gram at a pH of 4.0 and the activity at a pH of 9.0 was defined as the phosphatase activity.

TABLE 3

| | Frequency of Phosphatase Inclusion (%) |
|---|---|
| Soybean cake | 15 |
| Wheat flour | 98 |
| Fish meal | 45 |
| Corn meal | 24 |
| Tapioca | 11 |
| Rice bran | 21 |
| Fish oil | 95 |

While the invention has been described in detail and with reference to specific embodiments thereof, it will be apparent to one skilled in the art that various changes and modifications can be made therein without departing from the spirit and scope thereof.

What is claimed is:

1. A preparation for administration to an animal, comprising a phosphatase and a sparingly soluble L-ascorbic acid-2-phosphoric ester salt having a solubility in water of 10 wt % or less, the solubility being a value obtained by placing 100 g of purified water in a 200 ml-volume beaker, stirring the water while keeping the temperature at 20° C., adding 0.1 g of the L-ascorbic acid-2-phosphoric ester salt every 5 minutes by taking care not to cause gelation, and 30 minutes after the addition of L-ascorbic acid-2-phosphoric ester salt when the undissolved L-ascorbic acid-2-phosphoric ester salt is observed visually in the aqueous solution, determining the amount in weight percentage of L-ascorbic acid-2-phosphoric ester salt added based on water.

2. The preparation for administration to an animal as claimed in claim 1, wherein the sparingly L-ascorbic acid-2-phosphoric ester salt is a single or composite salt of a divalent or greater valence metal or a composite salt of a divalent or greater valence metal with a monovalent metal.

3. The preparation for administration to an animal as claimed in claim 1, wherein the sparingly soluble L-ascorbic acid-2-phosphoric ester salt is a composite material coated with a digestible and non-hydrophilic coating agent.

4. The preparation for administration to an animal as claimed in claim 1, which is formulated at a temperature of from 60 to 300° C. and/or under a pressure of from 0.001 to 10 MPa.

5. The preparation for administration to an animal as claimed in claim 1, as a feed or feed additives.

6. The preparation for administration to an animal as claimed in claim 1, which contains a phosphatase having a phosphatase activity of 1 or more, wherein when the activity of producing 1 μg of p-nitrophenol within one minute at the initial stage of reaction in a buffer solution at 37° C. using disodium p-nitrophenylphosphate as a substrate is considered as 1 unit, a larger value between the activity in terms of the unit number per gram at a pH of 4.0 and the activity at a pH of 9.0 is defined as the phosphatase activity.

7. The preparation for administration to an animal as claimed in claim 1, wherein the animal is one or more selected from the group consisting of fowl, quail, cattle, pig, horse, dog, cat, rat, mouse, guinea pig, monkey, Japanese river trout, carp, sea bream, salmon, eel, yellowtail, purple blue back bass, globefish, flatfish, tuna, saurel, horse mackerel, blue back bass, green tiger prawn and giant tiger prawn.

8. The preparation for administration to an animal as claimed in claim 1, wherein the sparingly soluble L-ascorbic acid-2-phosphoric ester salt is a composite salt of a divalent metal with one or two monovalent metal or divalent metal.

9. The preparation for administration to an animal as claimed in claim 8, wherein the composite salt is selected from the group consisting of calcium sodium salt, calcium potassium salt, calcium magnesium salt, magnesium sodium salt, magnesium calcium salt, magnesium sodium calcium salt, and magnesium potassium sodium salt.

10. A method for feeding an animal, comprising administrating a preparation for administration to an animal described in claim 1 to an animal.

11. The method for feeding an animal as claimed in claim 10, wherein the animal is one or more selected from the group consisting of fowl, quail, cattle, pig, horse, dog, cat, rat, mouse, guinea pig, monkey, Japanese river trout, carp, sea bream, salmon, eel, yellowtail, purple blue back bass, globefish, flatfish, tuna, saurel, horse mackerel, blue back bass, green tiger prawn and giant tiger prawn.

* * * * *